United States Patent Office 3,274,769
Patented Sept. 27, 1966

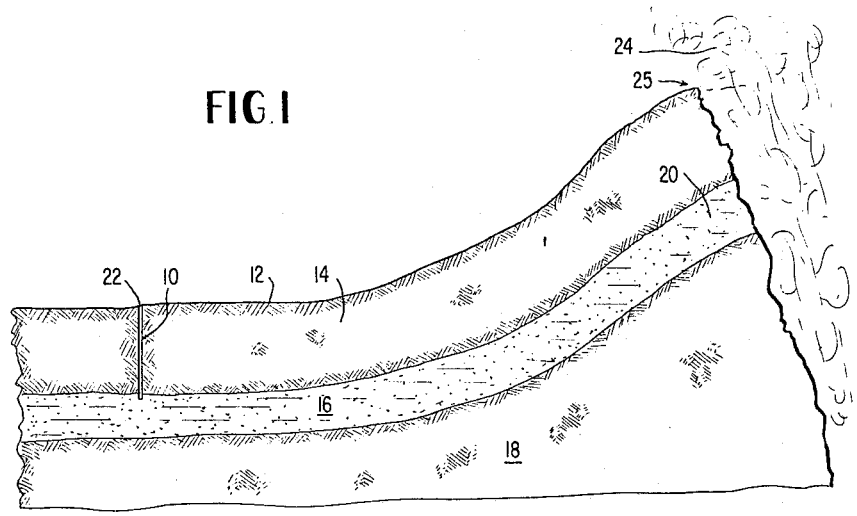
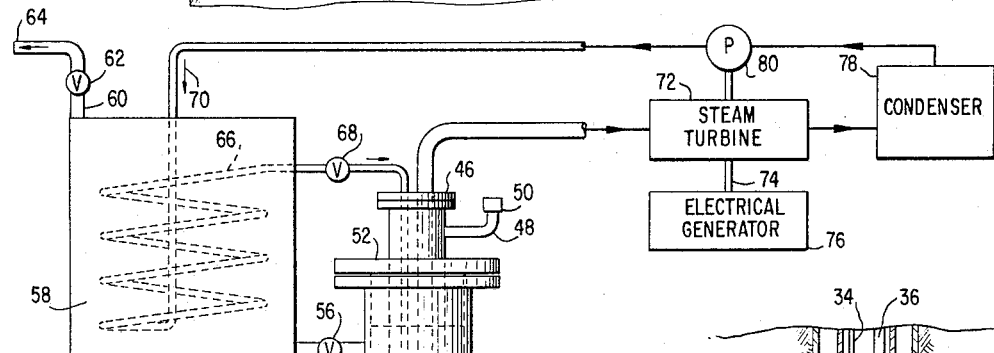
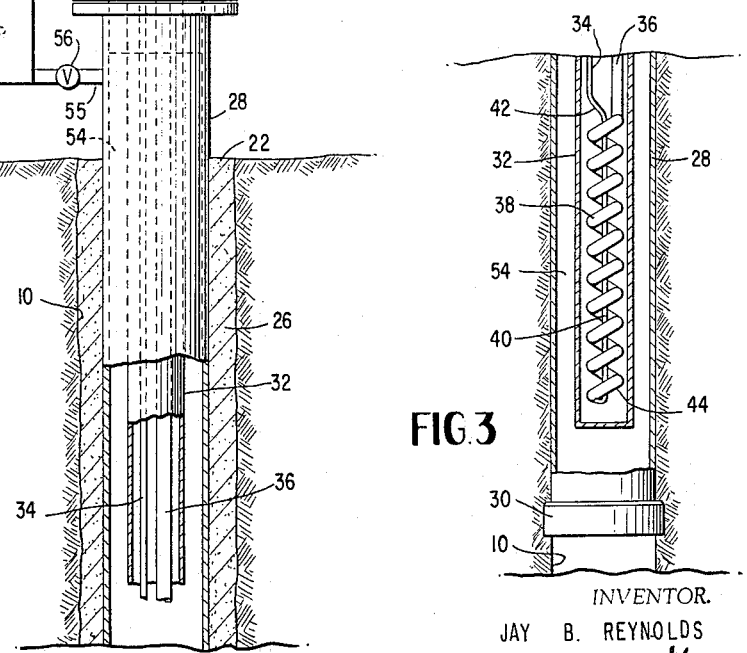

3,274,769
GROUND HEAT STEAM GENERATOR
Jay B. Reynolds, Fallon, Nev., assignor to J. B. Reynolds, Inc., Fallon, Nev., a corporation of Nevada
Filed May 5, 1964, Ser. No. 364,902
5 Claims. (Cl. 60—26)

This invention relates to a device for obtaining power from natural sources and more particularly to a subterranean heat exchange system and steam generator for obtaining useful work from ground heat i.e. the natural heat of the earth.

Almost since the beginning of time, man has been concerned with extracting energy from fuels and other natural resources for the purposes of doing useful work. Apart from combustion power such as coal and gas, man has successfully tapped other natural resources for energy, the most prominent of these being the early development of the windmill and in more recent times, the huge hydroelectric developments for generating electrical power. Less spectacular, but nevertheless promising, have been the attempts to harness the tremendous energies of the sun and the sea.

An additional tremendous natural source of energy is the natural heat of the earth. It has been estimated that the energy available from earth heat far exceeds that which may ever be extracted chemically from the world's entire supply of coal. Thus, relatively close at hand, but heretofore practically inaccessible, lies an additional reservoir of energy which may greatly augment the gradually diminishing supply of coal and other fuel resources.

Several attempts have been made to harness earth heat but insofar as applicant is aware, none of these has been commercially successful. In the early part of the Twentieth Century serious attempts were made off the coast of Cuba to obtain useful work from the heat differential existing at different depths in the ocean. While shown to be theoretically feasible, this system never produced sufficient power to be commercially practicable. Likewise, at about this time, steam wells in Italy were used to drive steam turbines in areas where steam was available from the ground due to the volcanic action of the earth on subterranean waters. However, the natural steam from the wells included large quantities of sulphur and other mineral and gas contaminants which quickly erroded and destroyed the metal parts of operating equipment contacted by the steam. A similar proposal several years later involving supplying water to hot subterranean beds of rock and then tapping steam from this rock by means of adjacent wells, similarly suffered the drawback that the steam thus obtained was full of mineral contaminants having an adverse effect on the operating equipment.

With the recent interest in the earth and the attempts to penetrate the earth crust, the question of tapping this natural source of heat energy, has again arisen. The present invention provides a novel steam generating system adapted to perform useful work from subterranean heat energy, which avoids the disadvantages of earlier systems, and particularly, the corrosive action of the contaminants in nature's steam. In the system of the present invention subterranean heat is applied through a heat exchanger to a closed system containing a non-corrosive fluid which does not deleteriously affect the operating parts of the equipment. In the preferred embodiment, this confined fluid takes the form of distilled water which is recirculated through a closed system including a steam turbine and condenser and since it is free of mineral contaminants (having previously been distilled) serious corrosion of the turbine condenser and associated equipment is avoided.

In the system of the present invention, the heat exchange is effected beneath the earth's surface between the distilled water or other noncorrosive fluid and the hot water emerging from a hot artesian well. Many such wells are found in various parts of the world including the western United States, Italy, New Zealand and many other areas where the earth is excessively hot. Hot artesian wells, or hot springs, as they are sometimes called, vary widely in temperature and it is not at all unusual to have water emerging from the top of the well at a temperature in the neighborhood of 150 or 160° F. At least one artesian well in New Zealand was recorded before the turn of the century which had a steady emerging water temperature as high as 197° F.

However, even with the lower temperature wells, the water a half mile or further beneath the surface of the earth may be much higher and may very well be substantially greater than 212° F., the boiling point of water at the earth's surface.

The present invention contemplates the provision of a heat exchange unit located in such a hot artesian well, sufficiently deep, such that the well water is hot enough to evaporate the noncorrosive fluid, preferably distilled water, so that it emerges from the well in the form of steam useable to drive a steam turbine or perform other useful work.

It is therefore one object of the present invention to provide a novel system for deriving useful energy from the heat of the earth.

Another object of the present invention is to provide a device for generating steam from ground heat.

Another object of the present invention is to provide a subterranean heat exchanger.

Another object of the present invention is to provide a novel heat exchange unit for incorporation in wells.

Another object of the present invention is to provide a steam generator for use in hot artesian wells.

Another object of the present invention is to provide an arrangement for extracting power from the heat of subterranean waters.

These and further objects and advantages of the invention will be more apparent, upon reference to the following specification, claims and appendant drawings, wherein FIG. 1 is a diagrammatic view with parts in section illustrating one type of rock formation which may produce a hot artesian well;

FIG. 2 is a schematic diagram showing the portion of the steam generator of the present invention adjacent the top of a well; and FIG. 3 is a cross-section of the system illustrating the subterranean heat exchange unit positioned at the desired level in the well for evaporating a noncorrosive fluid.

Artesian wells or springs are usually defined as subterranean waters which because of a pressure head rise from beneath the earth either close to or above the earth's surface. They are usually drilled vertically and depend for their action on the fact that a portion of the subterranean source is at a higher level than the mouth of the well. Many artesian wells are quite deep extending downwardly for several thousand feet and they derive their name from an area in France where wells of this type first became prominent.

Although deep well water is free from living organic matter, it contains a great deal of soluble mineral matter. Artesian waters have their source hundreds or thousands of feet below the surface and are free from bacteria because these microscopic organisms do not exist at that depth in the absence of light and oxygen. Many contaminants, in addition to the well known sulphur and other gaseous materials, include lime and magnesia; chiefly in the form of carbonates and sulphates and occasionally chlorides and nitrates. These materials, especially when present in hot wells, can be quite corrosive to power generating equipment, and for this reason, insofar as applicant is aware, subterranean sources have never been successfully commercially used for the production of power.

Referring to the FIG. 1 of the drawings there is illustrated the type terrain which might result in a successful hot artesian well. Terrain such as this exists in many areas of the world, the most common perhaps, being Italy but including other areas such as the western United States, New Zealand, Iceland and many other areas. In FIG. 1 there is shown at 10 the bore of a typical artesian well extending from the earth's surface 12 downwardly through a general layer of earth 14 into a fairly porous stratum of rock 16 through which water may diffuse. Beneath the porous stratum 16 is a lower layer 18. The earth layers 14 and 18 adjacent the porous stratum 16 are usually formed of relatively hard impervious rock so that the water is effectively trapped between earth layers 14 and 18 in the porous stratum 16. Furthermore, it will be noticed that this configuration generally follows the contour of the surface 12 and the confined porous stratum 16 carries over into an area 20 beneath the earth's surface which is higher than the mouth 22 of the well. Since, as is well known, water seeks its own level the pressure head generated by the higher water at 20 causes well water to move upwardly from the stratum 16 through the bore of the well 10 and out from the mouth of the well 22 at the surface. If the general area in which the well is located is volcanically active, as illustrated by the smoke 24 in FIG. 1, emitted from an adjacent volcano 26, then the water emitted from the well 10 may very well be quite warm. Of course, it is understood, that volcanic action is not necessary but that an artesian well adjacent any hotter than usual portion of the earth will suffice. These exist in Yellowstone National Park in the United States, and even in some of the hot spring areas of the eastern part of the United States, where the water issuing from the well may be quite warm. When the hot water is confined so that the well intermittently emits steam the well is usually called a geyser.

Referring to FIGS. 2 and 3, the bore 10 of the well at the mouth 22 is lined for some distance downwardly with grout 26 in a conventional manner to avoid leakage and positioned within this grout is a well casing 28 extending downwardly to terminate in a well casing shoe 30 at its lower end adjacent the bottom of the open hole or bore 10 formed in the hard rock formation. It is understood that the well casing terminates far enough down in the well so that the water rising through the bore 10 at the level of the heat exchanger is in excess of the temperature necessary to boil a noncorrosive fluid at useful pressures and preferably well above 212° F. The hot water is of course itself under the head of the rising stream of water above it.

Positioned within the well casing 28 and extending downwardly almost to the casing shoe 30, is a sealed metallic chamber 32 through which passes a relatively narrow or small diameter water pipe 34 in fluid communication with a relatively large diameter steam pipe 36. The lower end of steam pipe 36 is shaped into a plurality of helical coils 38 and the lower end 40 of water pipe 34 is bent as at 42, so that it passes through the center of the coils 38. The lower end of the pipe 34 communicates for fluid flow with the lowermost coil 44. Thus, water or other suitable noncorrosive fluid flows downwardly through the pipe 34 where it is heated by the hot water flowing upwardly through the well and turned into superheated steam in the coils 38 to subsequently pass upwardly through the steam pipe 36.

The upper end of casing 32 is suitably sealed off by a cap 46 through which pass the upper ends of water pipe 34 and steam pipe 36. Communicating with an exposed portion of the sealed chamber 32, is a feed pipe 48 suitably capped as at 50 when not in use. Feed pipe 48 is used to supply a heat exchange fluid such as ethylene glycol or the like to the chamber 32 which heat exchange fluid fills this chamber and helps to transmit the heat more uniformly from the lower portions of the chamber upwardly along the length of the well. Ethylene glycol is given by way of example only and other good heat transmitting fluids which have a high boiling temperature much greater than that of the noncorrosive fluid (water in the example given) may be utilized.

The extreme upper end of the well casing 28 is closed off by the stuffing box 52. Hot water passing upwardly through the annular area 54 between the inside of the well casing and the outside of the sealed chamber 34 is tapped off at an above-ground outlet 55 and passes through manual valve 56 to a preheat chamber 58. The outlet for the hot water from the artesian well escaping from the preheat chamber 58 is by way of outlet pipe 60 and valve 62 where it may be used for any suitable purpose. The well water discharge port 64 is preferably elevated above the chamber 58 to prevent vaporization either in the well or in the feed water preheater.

Within the preheat chamber 58 and forming a part of the preheater are a plurality of coils 66 into which the water pipe 34 is formed and these coils communicate with the well through the cap 46 by way of a manual valve 68. The water passes inwardly in the direction of the arrow 70 into the chamber 58 where it is preheated by the preferably steady rising stream of hot artesian well water, and subsequently passes through valve 68 into the well and downwardly into the heat exchanger in the bottom of the well where it is converted into steam. Since the feed water is preferably subject to a distillation process before being used in the device of the present invention, it does not carry any contaminants to deleteriously affect the materials of the power generating equipment.

While any suitable device may be provided to utilize the energy of the steam issuing from the top of steam pipe 36, FIG. 2 illustrates in block diagram form a steam turbine 72 to which this steam is applied. The conventional steam turbine drives by way of shaft 74 an electrical generator 76 for generating electrical power and also the output from the steam turbine may be used to drive a pump 80 provided to circulate the feed water through the preheater 58 and into the well. The steam outlet from turbine 72 is applied to a condenser 78 where the steam is condensed, collected and supplied to pump 80 for recirculation.

It is understood that the deposition of minerals from the steam either in turbine 72 or the condenser 78 is prevented in the present invention by the use of distilled water, which distilled water may be recirculated through the system and used many times. As the distilled water or other noncorrosive fluid becomes gradually depleted due to leakage and other losses it may be replenished as is necessary. Similarly, any loss of the heat transfer fluid such as ethylene glycol from the sealed chamber 32 may be replenished by periodically filling this chamber through feed pipe 48.

By means of the present invention the almost unlimited sources of earth heat may be utilized to provide energy for doing useful work. In areas where the water is quite hot the artesian well may be only a few hundred feet deep, whereas in areas where the heat is more remote from the earth's surface, it may be necessary to sink the well several thousand feet. In certain locations, such as the geyser and steam pool areas of the western United States, water temperatures well over 212° F. may be encountered a matter of only a few yards beneath the earth's surface. Furthermore, because of the substantial heads which may exist in some artesian wells, i.e. the subterranean waters may be collected over areas of tens and even hundreds of miles; the amount of hot water which may be used and hence the energy available, in many instances, is limited only by the diameter of the well.

Although described in conjunction with continuously flowing liquid wells such as hot springs the device of the present invention may also be used in geysers and steam wells. Because of the heat exchange system the natural steam from geysers and steam wells is isolated from the turbine and cannot seriously affect it. However the erosion problem as to the unit itself is not completely eliminated and for this reason it is preferred that the device be utilized in a spring and that the hot fluid pass through to the outlet port 64 completely in the liquid phase. In this way corrosion of the metal parts is minimized.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A device for extracting energy from the earth comprising a cylindrical container having a closed end insertable into a well and adapted to be filled with fluid, a liquid pipe and a gas pipe extending into said container and in fluid communication with each other adjacent said closed end of said container, said gas pipe being of larger diameter than said liquid pipe.

2. A device for extracting energy from the earth comprising an elongated cylindrical container for insertion into a well and having a closed end, a smaller liquid pipe and larger gas expansion pipe extending into said container, said pipes being in fluid communication with each other only adjacent said closed end of said container, means for supplying a noncorrosive fluid in the liquid phase to said smaller pipe, and means for extracting said noncorrosive fluid in the gaseous phase from said larger pipe.

3. A device for extracting energy from the earth comprising an elongated cylindrical container for insertion into a well and having a closed end, a preheater for hot water, a smaller water pipe and a larger expansion pipe extending into said container, said pipes being in fluid communication with each other only adjacent said closed end of said container, means for filling said container with a liquid having a higher boiling point than water, means for passing distilled water through said preheater and into said water pipe, and means for extracting steam from said expansion pipe.

4. A ground heat steam generator comprising a hot artesian well having upwardly flowing hot water, an elongated cylindrical container extending downwardly into said well, said container being filled with a heat exchange liquid, means for conducting distilled water to adjacent the bottom of said container where it is turned into steam by the heat from the water in said well, and means for conducting the steam out of said container.

5. A ground heat steam generator comprising a hot artesian well, a continuous piping system having an inlet and an outlet and extending downwardly into said well to adjacent its bottom whereby water in said piping system adjacent the bottom of said well is turned to steam, a sealed container in said well surrounding said piping system and filled with a liquid having a higher boiling point than water, a preheater adjacent said well having an elevated outlet port, means for directing the hot water from said well through said preheater to said outlet port, coils in said preheater, means coupling said coils to said piping system inlet, means for passing distilled water through said coils and into said piping system, a steam driven motive device adjacent said well, and means coupling said piping system outlet to said motive device.

References Cited by the Examiner

UNITED STATES PATENTS

| 1,867,975 | 7/1932 | Kilbourn et al. | 165—45 |
| 2,438,720 | 3/1948 | Smith | 165—45 |
| 2,461,449 | 2/1949 | Smith et al. | 165—45 X |
| 2,597,744 | 5/1952 | Morrison | 165—155 |
| 2,645,209 | 7/1953 | Digby | 165—105 X |
| 2,756,031 | 7/1956 | Sanstrom | 165—104 X |

FOREIGN PATENTS

| 335,148 | 9/1903 | France. |
| 814,146 | 3/1937 | France. |
| 982,175 | 1/1951 | France. |
| 97,246 | 10/1897 | Germany. |
| 361,473 | 2/1922 | Germany. |
| 498,700 | 10/1928 | Germany. |
| 59,350 | 2/1912 | Switzerland. |

OTHER REFERENCES

Setting Volcanoes to Work, Scientific American, October 27, 1917, pp. 305.

Power From the Earth, Scientific American, November 1929, pp. 422–424.

EDGAR W. GEOGHEGAN, *Primary Examiner.*

SAMUEL LEVINE, *Examiner.*

A. S. ROSEN, *Assistant Examiner.*